US012725084B2

(12) United States Patent
Fukami et al.

(10) Patent No.: US 12,725,084 B2
(45) Date of Patent: Sep. 1, 2026

(54) DISTRIBUTED LEARNING METHOD, DISTRIBUTED LEARNING SYSTEM, SERVER, AND PROGRAM

(71) Applicant: NTT, Inc., Tokyo (JP)

(72) Inventors: Takumi Fukami, Musashino (JP); Dai Ikarashi, Musashino (JP); Iifan Tyou, Musashino (JP)

(73) Assignee: NTT, Inc., Tokyo (JP)

( * ) Notice: Subject to any disclaimer, the term of this patent is extended or adjusted under 35 U.S.C. 154(b) by 479 days.

(21) Appl. No.: 18/564,628

(22) PCT Filed: Jun. 4, 2021

(86) PCT No.: PCT/JP2021/021336
§ 371 (c)(1),
(2) Date: Nov. 28, 2023

(87) PCT Pub. No.: WO2022/254689
PCT Pub. Date: Dec. 8, 2022

(65) Prior Publication Data
US 2024/0256974 A1 Aug. 1, 2024

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

2015/0154353 A1* 6/2015 Xiang .................... G06N 5/027
2020/0285980 A1* 9/2020 Sharad .................. G06N 3/098
2020/0358599 A1* 11/2020 Baracaldo Angel .... H04L 9/085

OTHER PUBLICATIONS

"Oportunities in Quantum Reservoir Computing and Extreme Learning Machines", Mujal et al., Jul. 10, 2021 (Year: 2021).*

(Continued)

*Primary Examiner* — Haimei Jiang
(74) *Attorney, Agent, or Firm* — XSENSUS LLP

(57) ABSTRACT

A distributed learning technology that can accelerate convergence while ensuring security is provided. A learning step of generating, by an i-th client, a model $\vec{w}_{i,j}$ in a j-th cycle using learning data $D_i$, an aggregation step of generating, by a server, a global model $\vec{w}_{g,j}$ in the j-th cycle from the models $\vec{w}_{1,j}, \ldots, \vec{w}_{N,j}$ in the j-th cycle according to a predetermined formula, and an end condition determination step of, by the server, ending learning processing with the global model $\vec{w}_{g,j}$ in the j-th cycle as the global model $\vec{w}_g$ in a case where a predetermined end condition is satisfied, and otherwise, transmitting the global model $\vec{w}_{g,j}$ in the j-th cycle to the i-th client, and an initialization step of setting, by the i-th client, the global model $\vec{w}_{g,j}$ in the j-th cycle as an initial value of a model $\vec{w}_{i,j+1}$ in a j+1-th cycle are included.

7 Claims, 5 Drawing Sheets

(56) References Cited

OTHER PUBLICATIONS

Wei et al., "Federated Learning With Differential Privacy: Algorithms and Performance Analysis", IEEE Transactions on Information Forensics and Security, vol. 15, 2020, pp. 3454-3469.

* cited by examiner

DISTRIBUTED LEARNING METHOD, DISTRIBUTED LEARNING SYSTEM, SERVER, AND PROGRAM

CROSS-REFERENCE TO RELATED APPLICATION

The present application is based on PCT filing PCT/JP2021/021336, filed Jun. 4, 2021, the entire contents of which are incorporated herein by reference.

TECHNICAL FIELD

The present invention relates to a distributed learning technology.

BACKGROUND ART

Distributed learning is a method in which a system including N clients and a server collectively learn learning data accumulated by the clients without passing the learning data to other clients and the server.

Hereinafter, processing in distributed learning will be described. Here, i is an integer of 1 or more and N or less.

(1) An i-th client learns a model $\vec{w}_i$ using the learning data accumulated by each of the clients.

(2) The i-th client transmits the model $\vec{w}_i$ to the server.

(3) The server receives the models $\vec{w}_1, \ldots, \vec{w}_N$ from all the clients and generates a global model $\vec{w}_g$ from the models $\vec{w}_1, \ldots, \vec{w}_N$. Processing of generating the global model $\vec{w}_g$ from the models $\vec{w}_1, \ldots, \vec{w}_N$ is also referred to as aggregation processing.

(4) The server transmits the global model $\vec{w}_g$ to each of the clients.

(5) Each of the clients sets the received global model $\vec{w}_g$ as an initial value of the model $\vec{w}_i$.

By repeating processing of (1) to (5), the system including the N clients and the server learns the global model $\vec{w}_g$. The learning data accumulated by each of the clients is not passed to other clients and the server by such processing. Note that a series of processing (1) to (5) is referred to as a learning cycle.

The aggregation processing of the processing (3) can be expressed as the following formula using a function A that receives vectors $\vec{w}_1, \ldots, \vec{w}_N$ as inputs and outputs a vector.

$$\vec{w}_g \leftarrow A(\vec{w}_1, \ldots, \vec{w}_N) \quad \text{[Math. 1]}$$

As a specific method of aggregation $A(\vec{w}_1, \ldots, \vec{w}_N)$, for example, there is a method using average value calculation or an optimization algorithm. The aggregation processing by the average value calculation is expressed by the following formula.

$$\vec{w}_g \leftarrow \frac{1}{N}\sum_{i=1}^{N} \vec{w}_i \quad \text{[Math. 2]}$$

In the distributed learning, since the global model $\vec{w}_g$ is transmitted to each of the clients every learning cycle, the clients can know the transition of the global model $\vec{w}_g$. As a result, attack of estimating learning data accumulated by another client is possible if a certain client has maliciousness. Therefore, in the distributed learning in consideration of differential privacy described in Non Patent Literature 1, security is enhanced by a random number r being added as a measure against the attack when the server generates the global model $\vec{w}_g$.

$$\vec{w}_g \leftarrow A(\vec{w}_1, \ldots, \vec{w}_N) + r \quad \text{[Math. 3]}$$

CITATION LIST

Non Patent Literature

Non Patent Literature 1: Kang Wei, et al., "Federated Learning with Differential Privacy: Algorithms and Performance Analysis," IEEE Transactions on Information Forensics and Security, 2020.

SUMMARY OF INVENTION

Technical Problem

However, the above-described method using a random number has an issue that convergence of learning is slow. Furthermore, there is also an issue that accuracy of a global model is poor even if the learning has converged.

Therefore, an object of the present invention is to provide a distributed learning technology that can accelerate convergence while ensuring security.

Solution to Problem

One aspect of the present invention is a distributed learning method in which a distributed learning system including N (N is an integer of 2 or more) clients and a server generates a global model $\vec{w}_g$, in which, where $A(\vec{w}_1, \ldots, \vec{w}_N)$ is a function that receives vectors $\vec{w}_1, \ldots, \vec{w}_N$ as inputs and outputs a vector, and i is an integer of 1 or more and N or less, a learning step of generating, by an i-th client, a model $\vec{w}_{i,j}$ in a cycle of generating a j-th global model $\vec{w}_{g,j}$ (hereinafter, referred to as a j-th cycle) using learning data $D_i$, an aggregation step of generating, by the server, a global model $\vec{w}_{g,j}$ in the j-th cycle from the models $\vec{w}_{1,j}, \ldots, \vec{w}_{N,j}$ in the j-th cycle according to a following formula:

$$\vec{w}_{g,j} \leftarrow A(\vec{w}_{1,j}, \ldots, \vec{w}_{N,j}) + r\delta(j) \quad \text{[Math. 4]}$$

(where r is a random number and δ(j) is a monotonically decreasing function), and an end condition determination step of, by the server, ending learning processing with the global model $\vec{w}_{g,j}$ in the j-th cycle as the global model $\vec{w}_g$ in a case where a predetermined end condition is satisfied, and otherwise, transmitting the global model $\vec{w}_{g,j}$ in the j-th cycle to the i-th client, and an initialization step of setting, by the i-th client, the global model $\vec{w}_{g,j}$ in the j-th cycle as an initial value of a model $\vec{w}_{i,j+1}$ in a j+1-th cycle.

Advantageous Effects of Invention

According to the present invention, convergence can be accelerated while security is ensured.

DESCRIPTION OF EMBODIMENTS

Figure 1:
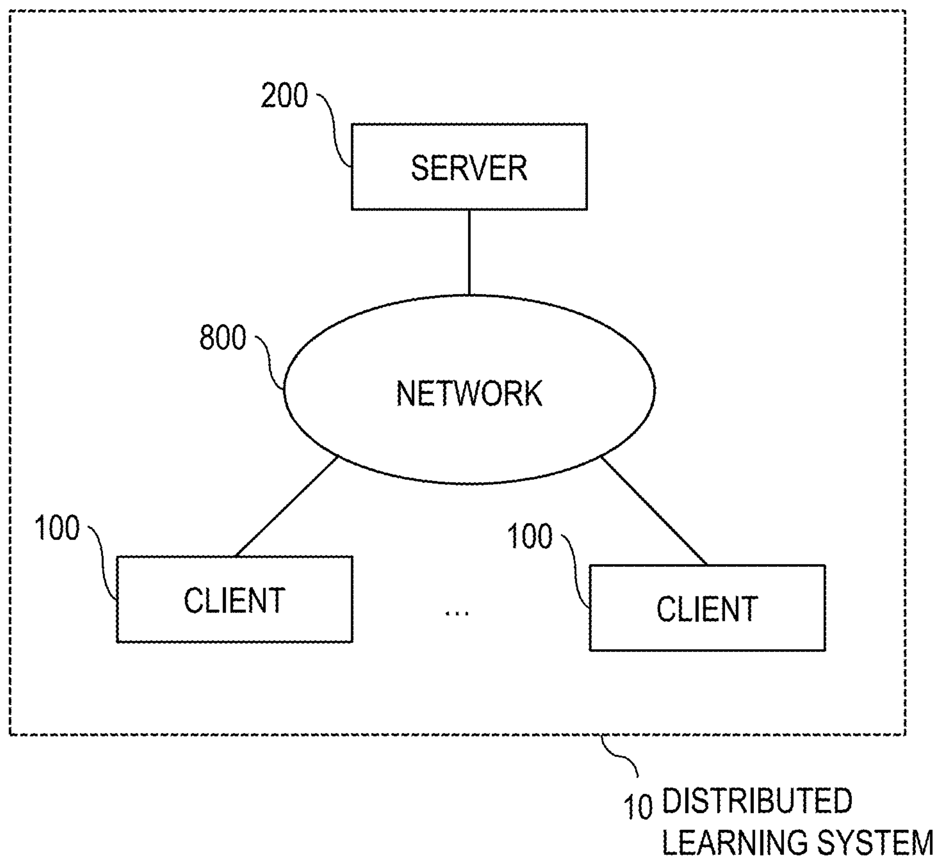
FIG. 1 is a block diagram illustrating a configuration of a distributed learning system 10.

Hereinafter, an embodiment of the present invention will be described in detail. Note that components having the same functions are denoted by the same reference numerals, and redundant description will be omitted.

Prior to the description of each embodiment, a notation method in this description will be described.

^ (caret) represents a superscript. For example, $x^{y^z}$ represents that $y^z$ is a superscript for x, and $x_{y^z}$ represents that $y^z$ is a subscript for x. Furthermore, (underscore) represents a subscript. For example, $x^{y_z}$ represents that $y_z$ is a superscript for x, and $x_{y_z}$ represents that $y_z$ is a subscript for x.

Furthermore, a superscript "^" or "~" such as ^x or ~x for a certain character x should be originally described directly above the "x", but is described as ^x or ~x due to restriction of notation in the description.

TECHNICAL BACKGROUND

In the embodiment of the present invention, the series of processing (1) to (5) described in [Background Art] is set as one cycle, and in the processing (3), the server generates a global model $^{\rightarrow}w_{g,j}$ generated in a j-th cycle by the following formula.

$$\vec{w}_{g,j} \leftarrow A(\vec{w}_{1,j}, \ldots, \vec{w}_{N,j}) + r\delta(j) \quad \text{[Math. 5]}$$

Here, r is a random number, and δ(j) is a monotonically decreasing function of a variable j.

By δ(j) being set as a monotonically decreasing function, influence of the learning data accumulated by the clients on update of the global model decreases as the learning progresses, so that security is not impaired even if the random number is decreased as the cycle progresses. Furthermore, the smaller the random number, the faster the convergence, and the higher the accuracy of the global model.

Hereinafter, a specific example of the function δ(j) will be described.

Example 1

It is assumed that δ(j)=k/α(j), a function α(j) is a monotonically increasing function such as α(j)=j, α(j)=$j^2$, α(j)=log(j), or α(j)=$j^{1/2}$, and an adjustment parameter k is a constant such as k=1.

Example 2

It is assumed that δ(j)=k(j)/α(j), the function α(j) is a monotonically increasing function as exemplified in Example 1, and an adjustment parameter k(j) is a function expressed by k(j)=|A($^{\rightarrow}w_{i,j}$, . . . , $^{\rightarrow}w_{N,j}$)-$^{\rightarrow}w_{g,j-1}$|.

$$\vec{w}_{g,j} \leftarrow A(\vec{w}_{1,j}, \ldots, \vec{w}_{N,j}) + r\frac{|A(\vec{w}_{1,j}, \ldots, \vec{w}_{N,j}) - \vec{w}_{g,j-1}|}{\alpha(j)} \quad \text{[Math. 6]}$$

In this case, α(j)=1, that is, the function α(j) may be a monotonically increasing function in a broad sense.

In general, since the learning converges as the cycle is repeated, a difference of the global model |$\rightarrow w_{g,j}$−$\rightarrow w_{g,j-1}$| decreases, and as a result, |A($^{\rightarrow}w_{1,j}$, . . . , $^{\rightarrow}w_{N,j}$)−$\rightarrow w_{g,j-1}$|/α(j) also decreases.

Note that, in both Example 1 and Example 2, the random number r can be a number generated according to a Laplace distribution or a Gaussian distribution having an average of 0.

First Embodiment

Here, a distributed learning system 10 will be described. The distributed learning system 10 includes N (N is an integer of 2 or more) clients and a server, and generates a global model $^{\rightarrow}w_g$. At that time, a function A ($^{\rightarrow}w_1$, . . . , $^{\rightarrow}w_N$) that receives vectors $^{\rightarrow}w_i$, . . . , $^{\rightarrow}w_N$ as inputs and outputs a vector is used.

The distributed learning system 10 will be described with reference to FIG. 1. FIG. 1 is a block diagram illustrating an example of a configuration of the distributed learning system 10. The distributed learning system 10 includes N clients 100 and a server 200. The N clients 100 and the server 200 are connected to a network 800 such as the Internet, and each of the clients 100 and the server 200 can communicate with each other.

Figure 2:
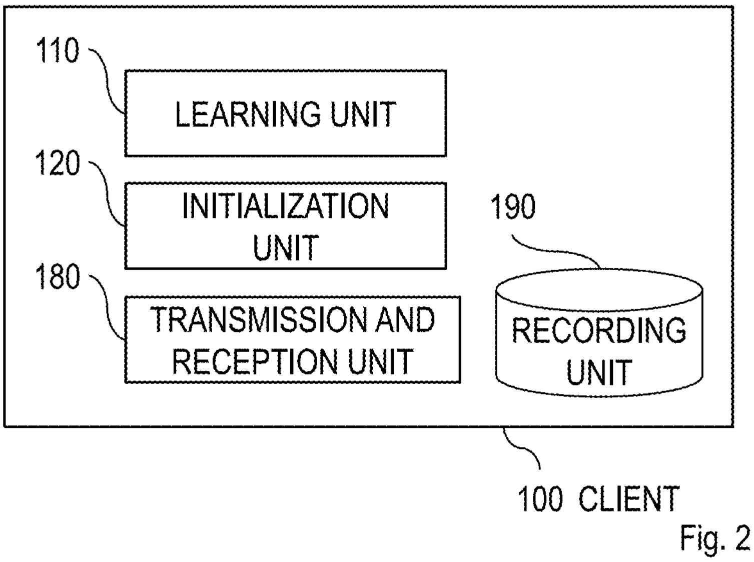
FIG. 2 is a block diagram illustrating a configuration of a client 100.
Figure 3:
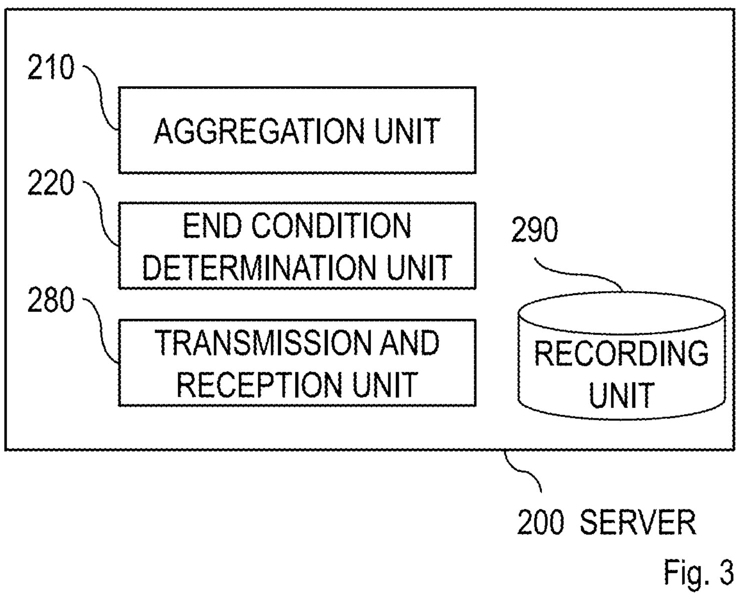
FIG. 3 is a block diagram illustrating a configuration of a server 200.

Next, each device of a client 100 and the server 200 will be described with reference to FIGS. 2 to 3. FIG. 2 is a block diagram illustrating an example of a configuration of a client 100. The client 100 includes a learning unit 110, an initialization unit 120, a transmission and reception unit 180, and a recording unit 190. The transmission and reception unit 180 is a configuration unit that appropriately transmits and receives information that the client 100 needs to exchange with other devices. The recording unit 190 is a configuration unit that appropriately records information necessary for processing of the client 100. The recording unit 190 records, for example, learning data. FIG. 3 is a block diagram illustrating an example of a configuration of the server 200. The server 200 includes an aggregation unit 210, an end condition determination unit 220, a transmission and reception unit 280, and a recording unit 290. The transmission and reception unit 280 is a configuration unit that appropriately transmits and receives information that the server 200 needs to exchange with other devices. The recording unit 290 is a configuration unit that appropriately records information necessary for processing of the server 200.

Figure 4:
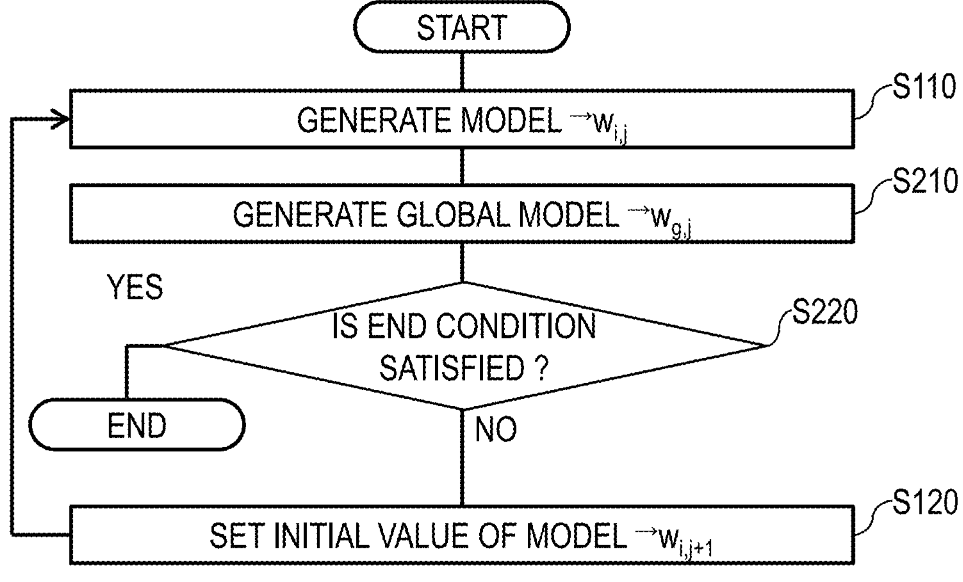
FIG. 4 is a flowchart illustrating operation of the distributed learning system 10.

Operation of the distributed system 10 will be described with reference to FIG. 4. Hereinafter, i is an integer of 1 or more and N or less, and each of the N clients 100 is referred to as an i-th client 100.

In S110, the learning unit 110 of the i-th client 100 generates a model $^{\rightarrow}w_{i,j}$ in a cycle of generating a j-th global model $^{\rightarrow}w_{g,j}$ (hereinafter, referred to as a j-th cycle) using learning data $D_i$, and transmits the model $^{\rightarrow}w_{i,j}$ in the j-th cycle to the server 200 using the transmission and reception unit 180.

Note that the learning unit 110 of the i-th client 100 sets an appropriate value as an initial value of a model $^{\rightarrow}w_{i,1}$ in a first cycle. The initial value of the model $^{\rightarrow}w_{i,1}$ may be recorded in the recording unit 190 in advance.

Furthermore, the learning data $D_i$ recorded in the recording unit 190 of the i-th client 100 is not transmitted to other clients 100 or the server 200.

In S210, the aggregation unit 210 of the server 200 receives the model $\vec{w}_{i,j}$ in the j-th cycle using the transmission and reception unit 280. The aggregation unit 210 of the server 200 generates the global model $\vec{w}_{g,j}$ in the j-th cycle from the models $\vec{w}_{i,j}, \ldots, \vec{w}_{N,j}$ in the j-th cycle according to the following formula.

$$\vec{w}_{g,j} \leftarrow A(\vec{w}_{1,j}, \ldots, \vec{w}_{N,j}) + r\delta(j) \quad \text{[Math. 7]}$$

(where r is a random number and $\delta(j)$ is a monotonically decreasing function)

The function $\delta(j)$ can be a function expressed as $\delta(j)=k/\alpha(j)$, where the function $\alpha(j)$ is a monotonically increasing function, and k is a predetermined constant. Furthermore, the function $\delta(j)$ can be a function expressed by the following formula, where the function $\alpha(j)$ is a monotonically increasing function.

$$\delta(j) = \frac{|A(\vec{w}_{1,j}, \ldots, \vec{w}_{N,j}) - \vec{w}_{g,j-1}|}{\alpha(j)} \quad \text{[Math. 8]}$$

Furthermore, the random number r can be generated according to a Laplace distribution or a Gaussian distribution having an average of 0.

In S220, in a case where a predetermined end condition is satisfied, the end condition determination unit 220 of the server 200 ends learning processing with the global model $\vec{w}_{g,j}$ in the j-th cycle as a global model $\vec{w}_g$, and otherwise, transmits the global model $\vec{w}_{g,j}$ in the j-th cycle to the i-th client using the transmission and reception unit 280. As the end condition, for example, a condition of whether an upper limit T of the cycle has been reached can be used.

In S120, the initialization unit 120 of the i-th client 100 receives the global model $\vec{w}_{g,j}$ in the j-th cycle using the transmission and reception unit 180. The initialization unit 120 of the i-th client 100 sets the global model $\vec{w}_{g,j}$ in the j-th cycle as an initial value of a model $\vec{w}_{i,j+1}$ in a j+1-th cycle, and returns to processing of S110.

Note that the distributed learning system 10 may be formed to generate the global model $\vec{w}_g$ using secret calculation.

According to the embodiment of the present invention, convergence can be accelerated while security is ensured.

<Supplement>

Figure 5:
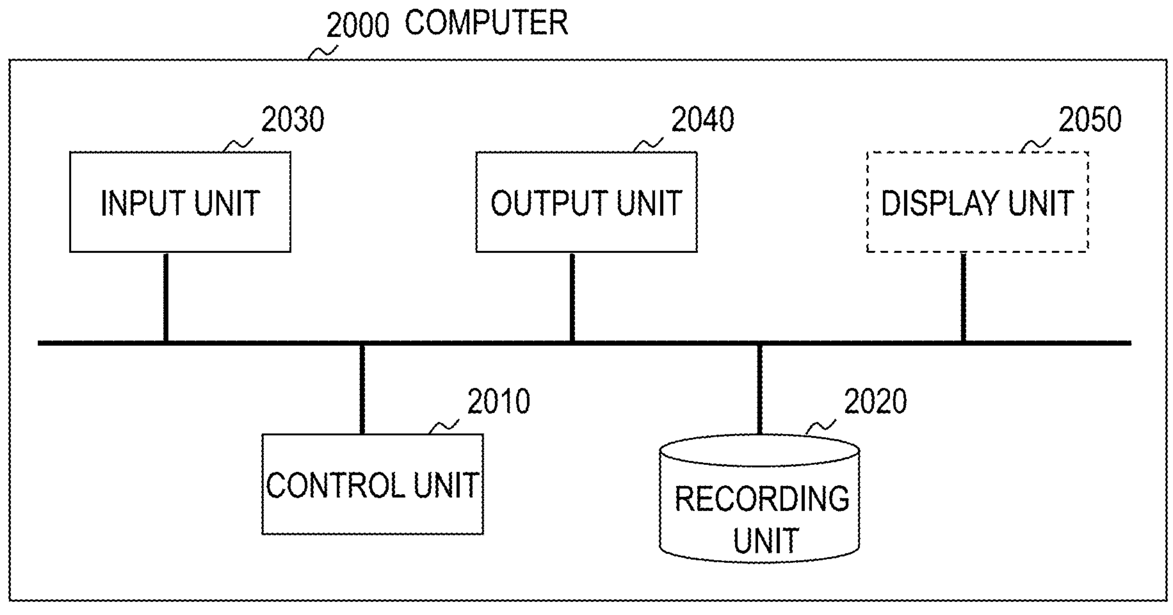
FIG. 5 is a diagram illustrating an example of a functional configuration of a computer that implements each device in an embodiment of the present invention.

FIG. 5 is a diagram illustrating an example of a functional configuration of a computer that implements each device described above. Processing in each device described above can be performed by a recording unit 2020 being caused to read a program for causing the computer to function as each device described above and a control unit 2010, an input unit 2030, an output unit 2040, and the like being caused to operate.

A device according to the present invention includes, for example, an input unit to which a keyboard or the like can be connected as a single hardware entity, an output unit to which a liquid crystal display or the like can be connected, a communication unit to which a communication device (e.g., a communication cable) capable of communicating with the outside of the hardware entity can be connected, a CPU (Central Processing Unit in which a cache memory, a register, or the like may be included), a RAM or a ROM as a memory, an external storage device as a hard disk, and a bus that connects the input unit, the output unit, the communication unit, the CPU, the RAM, the ROM, and the external storage device so that data can be exchanged therebetween. Moreover, a device (drive) or the like that can read and write data from and to a recording medium such as a CD-ROM may be provided in the hardware entity as necessary. Examples of a physical entity including such a hardware resource include a general-purpose computer.

The external storage device of the hardware entity stores a program that is required for implementing the above-described functions, data that is required for processing of the program, and the like (the program may be stored, for example, in a ROM as a read-only storage device instead of the external storage device). Moreover, data or the like obtained by processing of the program is appropriately stored in a RAM, an external storage device, or the like.

In the hardware entity, each program stored in the external storage device (or ROM etc.) and data required for processing of each program are read into a memory as necessary and are appropriately interpreted and processed by the CPU. As a result, the CPU implements a predetermined function (each component unit represented as . . . unit, . . . means, etc.).

The present invention is not limited to the above-described embodiment and can be appropriately modified without departing from the gist of the present invention. Moreover, the processing described in the above embodiment may be performed not only in time-series according to the described order, but also in parallel or individually according to the processing capability of the device that performs the processing or as necessary.

As described above, in a case where the processing function of the hardware entity (the device according to the present invention) described in the above embodiment is implemented by a computer, processing content of the function of the hardware entity is described by a program. In addition, the computer executes the program, and thus, the processing function of the hardware entity is implemented on the computer.

The program in which the processing content is written can be recorded in a computer-readable recording medium. The computer-readable recording medium may be, for example, any recording medium such as a magnetic recording device, an optical disk, a magneto-optical recording medium, or a semiconductor memory. Specifically, for example, a hard disk device, a flexible disk, a magnetic tape, or the like, can be used as the magnetic recording device, a DVD (Digital Versatile Disc), a DVD-RAM (Random Access Memory), a CD-ROM (Compact Disc Read Only Memory), a CD-R (Recordable)/RW (ReWritable), or the like, can be used as the optical disk, an MO (Magneto-Optical disc), or the like, can be used as the magneto-optical recording medium, an EEP-ROM (Electronically Erasable and Programmable-Read Only Memory), or the like, can be used as the semiconductor memory.

Further, the program is distributed by, for example, selling, transferring, or renting a portable recording medium such as a DVD and a CD-ROM in which the program is recorded. Further, the program may be stored in a storage device of a server computer, and the program may be distributed by transferring the program from the server computer to another computer via a network.

For example, the computer that executes such a program first temporarily stores the program recorded in the portable recording medium or the program transferred from the server computer in the storage device of the own computer. The computer then reads the program stored in the storage device, and performs processing in accordance with the read program at the time of performance of the processing. Also, in other performance modes of the program, the computer may read the program directly from the portable recording medium and performs processing in accordance with the program, or alternatively, the computer may sequentially perform processing in accordance with the received program every time the program is transferred from the server computer to the computer. Alternatively, the above processing may be performed by a so-called ASP (Application Service Provider) service that implements a processing function only by issuing an instruction to perform the program and acquiring the result, without transferring the program from the server computer to the computer. Note that the program in this mode includes information that is to be used in processing by an electronic computer and is equivalent to the program (data and the like that are not direct commands to the computer but have properties that define the processing to be performed by the computer).

Moreover, although the hardware entity is formed by performing a predetermined program on a computer in this mode, at least some of the processing content may be implemented by hardware.

The description of the embodiment of the present invention described above has been presented for purposes of illustration and description. There is no intention to be comprehensive or to limit the invention to the disclosed precise form. Modifications and variations can be made from the foregoing instructions. The embodiment has been selected and represented in order to provide the best illustration of the principles of the present invention and to enable those skilled in the art to utilize the present invention in various embodiments with various modifications added such that the present invention is appropriate for considered practical use. All such modifications and variations are within the scope of the present invention as defined by the appended claims, interpreted in accordance with a fairly and legally equitable breadth.

The invention claimed is:

1. A distributed learning method in which a distributed learning system including N clients and a server generates a global model $\vec{w}_g$, N being an integer of 2 or more, the distributed learning method comprising:

where $A(\vec{w}_1, \ldots, \vec{w}_N)$ is a function that receives vectors $\vec{w}_1, \ldots, \vec{w}_N$ as inputs and outputs a vector, and i is an integer of 1 or more and N or less, generating, by an i-th client, a model $\vec{w}_{i,j}$ in a cycle of generating a j-th global model $\vec{w}_{g,j}$ (i-th cycle) using learning data $D_i$;

generating, by the server, a global model $\vec{w}_{g,j}$ in the j-th cycle from the models $\vec{w}_{1,j}, \ldots, \vec{w}_{N,j}$ in the j-th cycle according to a following formula:

$$\vec{w}_{g,j} \leftarrow A(\vec{w}_{1,j}, \ldots, \vec{w}_{N,j}) + r\delta(j)$$

where r is a random number and δ(j) is a monotonically decreasing function;

ending, by the server, learning processing with the global model $\vec{w}_{g,j}$ in the j-th cycle as the global model $\vec{w}_g$ in a case where a predetermined end condition is satisfied, and otherwise, transmitting the global model $\vec{w}_{g,j}$ in the j-th cycle to the i-th client; and setting, by the i-th client, the global model $\vec{w}_{g,j}$ in the j-th cycle as an initial value of a model $\vec{w}_{i,j+1}$ in a j+1-th cycle.

2. The distributed learning method according to claim 1, wherein a function α(j) is a monotonically increasing function, and k is a predetermined constant, and a function δ(j) is a function expressed as δ(j)=k/α(j).

3. The distributed learning method according to claim 1, wherein a function α(j) is a monotonically increasing function, and a function δ(j) is a function expressed by a following formula:

$$\delta(j) = \frac{\left|A(\vec{w}_{1,j}, \ldots, \vec{w}_{N,j}) - \vec{w}_{g,j-1}\right|}{\alpha(j)}.$$

4. The distributed learning method according to claim 1, wherein a random number r is generated according to a Laplace distribution or a Gaussian distribution having an average of 0.

5. A distributed learning system comprising:

N clients; and a server, wherein

N is an integer of 2 or more, the distributed learning system generates a global model $\vec{w}_g$, where $A(\vec{w}_1, \ldots, \vec{w}_N)$ is a function that receives vectors $\vec{w}_1, \ldots, \vec{w}_N$ as inputs and outputs a vector, and i is an integer of 1 or more and N or less, an i-th client includes a learning circuitry configured to generate a model $\vec{w}_{i,j}$ in a cycle of generating a j-th global model $\vec{w}_{g,j}$ (i-th cycle) using learning data $D_i$, and an initialization circuitry configured to set a global model $\vec{w}_{g,j}$ in the j-th cycle as an initial value of a model $\vec{w}_{i,j+1}$ in a j+1-th cycle, and the server includes an aggregation circuitry configured to generate the global model $\vec{w}_{g,j}$ in the j-th cycle from the models $\vec{w}_{1,j}, \ldots, \vec{w}_{N,j}$ in the j-th cycle according to a following formula:

$$\vec{w}_{g,j} \leftarrow A(\vec{w}_{1,j}, \ldots, \vec{w}_{N,j}) + r\delta(j)$$

where r is a random number and δ(j) is a monotonically decreasing function, and an end condition determination circuitry configured to end learning processing with the global model $\vec{w}_{g,j}$ in the j-th cycle as the global model $\vec{w}_g$ in a case where a predetermined end condition is satisfied, and otherwise, to transmit the global model $\vec{w}_{g,j}$ in the j-th cycle to the i-th client.

6. A server included in a distributed learning system that generates a global model $\vec{w}_g$, the server comprising:

an aggregation circuitry configured to, where $A(\vec{w}_1, \ldots, \vec{w}_N)$ is a function that receives vectors $\vec{w}_1, \ldots, \vec{w}_N$ as inputs and outputs a vector, i is an integer of 1 or more and N or less, and $\vec{w}_{i,j}$ is a generated model by an i-th client in a cycle of generating a j-th global model $\vec{w}_{g,j}$ (j-th cycle) using learning data $D^i$, generate a global model $\vec{w}_{g,j}$ in the j-th cycle from the models $\vec{w}_{1,j}, \ldots, \vec{w}_{N,j}$ in the j-th cycle according to a following formula:

$$\vec{w}_{g,j} \leftarrow A(\vec{w}_{1,j}, \ldots, \vec{w}_{N,j}) + r\delta(j)$$

where r is a random number and δ(j) is a monotonically decreasing function; and an end condition determination circuitry configured to end learning processing with the global model $\vec{w}_{g,j}$ in the j-th cycle as the global model $\vec{w}_g$ in a case where a predetermined end condition is satisfied, and otherwise, to transmit the global model $\vec{w}_{g,j}$ in the j-th cycle to the i-th client.

7. A non-transitory recording medium recording a program for causing a computer to perform the distributing learning method of claim 1.

* * * * *